United States Patent [19]

Boden

[11] 4,300,269
[45] Nov. 17, 1981

[54] CORD LOCKS OR THE LIKE RESISTANT TO TAMPERING

[76] Inventor: Ogden W. Boden, 1580 Gaywood Dr., Altadena, Calif. 91001

[21] Appl. No.: 122,604

[22] Filed: Feb. 19, 1980

[51] Int. Cl.³ .......................................... F16G 11/00
[52] U.S. Cl. .................................. 24/134 R; 16/171
[58] Field of Search ............. 24/132, 134 R, 134 KA, 24/166, 191, 170; 70/64, 65, 66, 19; 292/258, 325; 16/171, 174

[56] References Cited

U.S. PATENT DOCUMENTS

| | | | |
|---|---|---|---|
| 1,526,606 | 2/1925 | Moloney | 70/65 X |
| 2,649,635 | 8/1953 | Peterson | 24/134 R X |
| 2,845,674 | 8/1958 | Pearson | 24/134 R |
| 3,087,192 | 4/1963 | Hertzke | 16/174 X |
| 3,156,756 | 11/1964 | Seaver | 16/171 X |
| 3,165,801 | 1/1965 | Stansbury, Jr. et al. | 24/134 R |
| 3,371,506 | 3/1968 | Zahn | 16/171 X |
| 3,432,882 | 3/1969 | Farouche | 16/171 |
| 3,952,369 | 4/1976 | Erickson | 16/171 |
| 4,253,260 | 3/1981 | Maza et al. | 16/171 X |

Primary Examiner—Roy D. Frazier
Assistant Examiner—Peter A. Aschenbrenner
Attorney, Agent, or Firm—William P. Green

[57] ABSTRACT

A device for locking one or more cords or other flexible elements against longitudinal movement, and including two members interconnected for relative pivotal movement between locking and released positions, with one of the members having a portion which is slightly laterally deflectible upon assembly of the device to permit movement of a pivot lug into a pivot recess to form the pivotal connection between the members, and with the other member having an interlocking projection which in the locking relative position of the members blocks lateral movement of the deflectible portion of the first member to prevent disassembly of the parts in that locking position.

23 Claims, 16 Drawing Figures

CORD LOCKS OR THE LIKE RESISTANT TO TAMPERING

BACKGROUND OF THE INVENTION

This invention relates to improved devices for locking cords or other elongated flexible elements against longitudinal movement, as for instance in fastening a drawstring of a bag, container, garment or other item in a closed or tightened condition.

In my copending application Ser. No. 106,714 filed Dec. 26, 1979 on "Locks for Holding Elongated Flexible Elements", there has been disclosed a type of cord or belt locking device including two members which are preferably formed of injection molded resinous plastic material, and one of which is connected to the other for relative pivotal movement between an active gripping or locking position in which one or more coacting cords or other elongated flexible elements are retained against longitudinal movement, and a released position permitting such longitudinal movement. The two members are interconnected for the desired relative pivotal movement between locking and released positions by interfitting pivotal connector portions, one forming a pivot lug carried by one of the members, and the other connector portion forming or containing a recess within which the lug is received and journaled for relative pivotal movement. One of the pivotal connector portions is slightly deflectible during assembly of the parts to pass the pivot lug into the recess, with the deflectible portion by its resilience acting to then return from the deflected position to a normal position in which it remains during subsequent use and operation of the device. Preferably one of the members includes two spaced walls carrying two connector portions or elements and adapted for deflection away from one another in opposite directions as the two members are assembled.

SUMMARY OF THE INVENTION

The present invention provides improvements in the above discussed type of device, for preventing the two relatively pivotable members from being surreptitiously disassembled by distortion of the mentioned resiliently deflectible connector portion or portions while the members are in their locking relative positions. To avoid such tampering, the two relatively pivotable members are constructed to have a unique interlocking relationship when in their locking relative positions, with that relationship being such as to positively prevent lateral deflection of the connector structure in the locking position of the parts, but to permit such deflection in the released position of the members for assembly and disassembly. Desirably, one of the pivotally interconnected members has two interlocking parts or projections extending to locations at the outer sides of two spaced walls of the other member, which walls in the released relative position of the members are deflectible away from one another to enable assembly of the parts, and in the locking condition of the members are blocked against lateral separating deflection by the interlocking projections.

BRIEF DESCRIPTION OF THE DRAWINGS

The above and other features and objects of the invention will be better understood from the following detailed description of the typical embodiments illustrated in the accompanying drawings, in which.

DESCRIPTION OF THE PREFERRED EMBODIMENT

The form of the invention typically illustrated in FIGS. 1 to 7 is a cord locking device 10 acting to releasably lock a pair of flexible cords 11 and 12 against longitudinal movement relative to the device 10. It is contemplated that the invention is applicable also to devices for locking other types of elongated flexible elements against longitudinal movement, such as for example a flat belt. It is also contemplated that the two cords 11 and 12 illustrated in the drawings may in fact be opposite ends of a single cord, typically functioning as a drawstring for a bag, garment, back pack, or the like.

Figure 1:
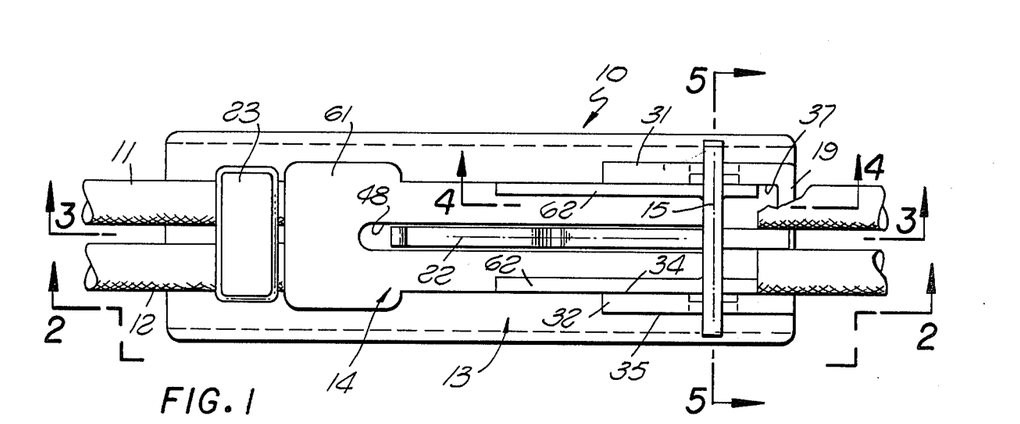
FIG. 1 is a plan view of a cord lock constructed in accordance with the invention.
Figure 2:
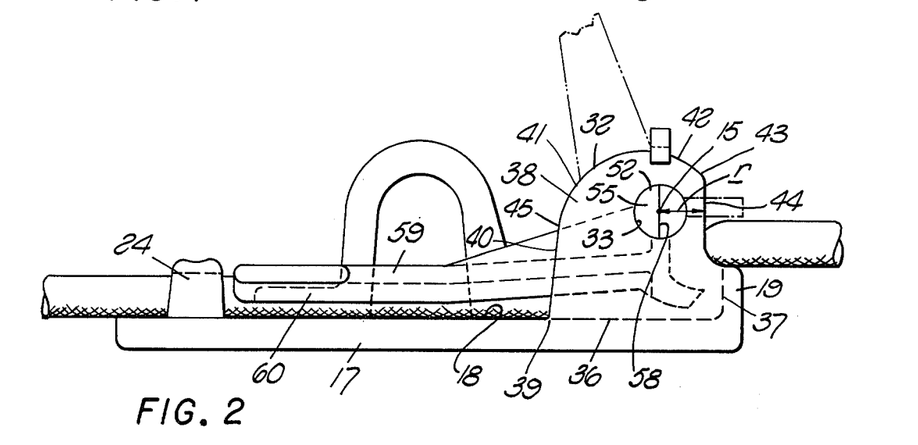
FIG. 2 is a side elevational view taken on line 2—2 of FIG. 1.
Figure 3:
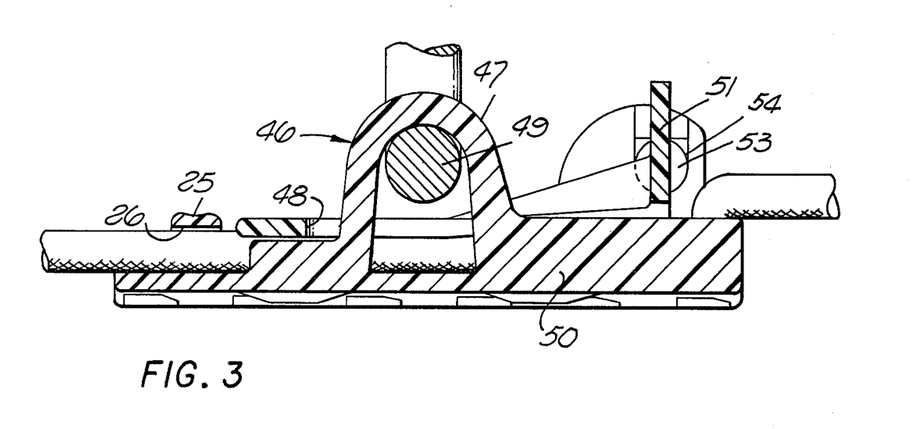
FIG. 3 is a central vertical longitudinal section taken on line 3—3 of FIG. 1.
Figure 4:
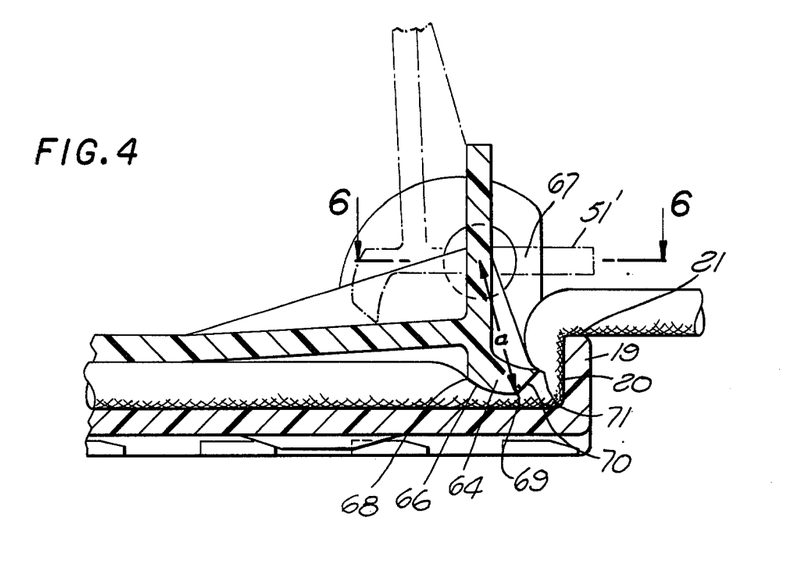
FIG. 4 is a fragmentary vertical longitudinal section taken on line 4—4 of FIG. 1.
Figure 5:
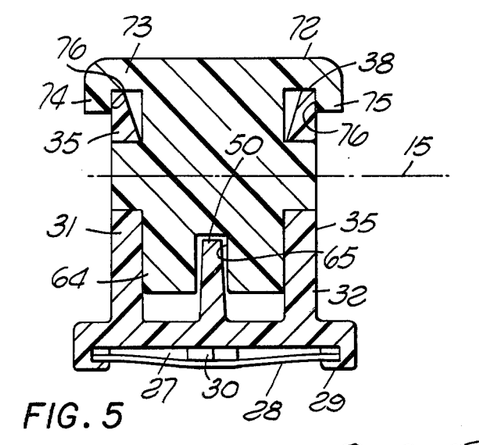
FIG. 5 is a transverse vertical section taken on line 5—5 of FIG. 1.
Figure 6:
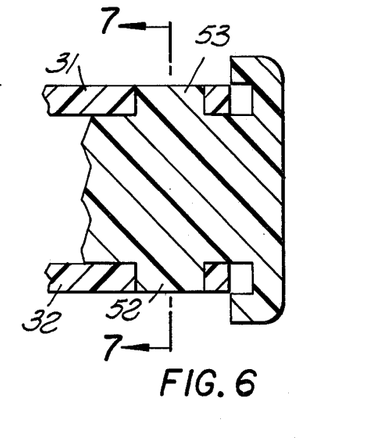
FIG. 6 is a fragmentary horizontal section taken on line 6—6 of FIG. 4, and assuming the swinging locking member to be in the released broken line position of that figure.

The cord lock 10 includes a body member 13 and a locking member 14 which is mounted to body 13 for relative pivotal movement about an axis 15 between the full line locking position of FIGS. 1 to 4 and the released or unlocked position illustrated in broken lines in FIGS. 2 and 4. Body 13 has a base portion 17 which is illustrated as extending horizontally in the FIG. 2 position of the device, and which has a planar horizontal upper surface 18 along which the two cords 11 and 12 extend in laterally spaced parallel relation. At the right end of body 13 as viewed in FIG. 2, that body has an upwardly projecting end wall 19 (FIG. 4), having an inner vertical surface 20 perpendicular to surface 18 of the base. The cords 11 and 12 extend upwardly adjacent the surface 20 of end wall 19, as seen in FIG. 4, and then extend rightwardly past the upper edge 21 of wall 19. Body 13 may be considered as having a longitudinal axis 22, with cords 11 and 12 being received at opposite sides of that axis and extending parallel thereto as the cords extend along the upper surface 18 of base 17. Inner surface 20 of end wall 19 of body 13 is disposed perpendicular to the longitudinal axis 22 of the body. At the left end of the base portion 17 of body 13, the body has an upwardly projecting portion 23, forming two spaced upwardly projecting side walls 24 and a top wall 25 defining within portion 24 a passage 26 through which the two cords 11 and 12 extend, and within which the left ends of the cords are effectively confined and located for proper engagement with locking member 14. At its underside, base portion 17 of body 13 may form a shallow recess or guideway 27 within which an address or labeling card 28 may be slidably received, to identify the bag or other item associated with or tightened by cords 11 and 12. As seen in FIG. 5, the opposite edges of card 28 may be retained by flanges 29 forming grooves shaped to receive and locate those edges. Projections 30 extending downwardly from the base portion of body 13 may engage the central portion of the card 28 to bend it slightly and thus assure effective frictional retention of the card within recess 27.

For pivotally carrying the swinging locking arm 14, body 13 has at its right end as viewed in FIGS. 1 to 4 a pair of spaced parallel vertical upwardly projecting side walls 31 and 32 containing aligned similar circular pivot openings or recesses 33 centered about axis 15. The two walls 31 and 32 are perpendicular to axis 15, and have inner and outer vertical planar surfaces 34 and 35 all parallel to one another and parallel to the longitudinal axis 22 of body 13 and to a vertical plane containing axis 22. The pivotal axis 15 is perpendicular to surfaces 34 and 35 and is perpendicular to a vertical plane containing main longitudinal axis 22 of the device. At their lower edges, the two walls 31 and 32 connect integrally at 36 with the horizontal base portion 17 of part 13, and at their forward edges, walls 31 and 32 connect integrally at 37 with the front transverse wall 19 of body 13. Walls 31 and 32 project upwardly higher than transverse wall 19, and are defined by peripheral edges 38 which for the two walls 31 and 32 are identical and have the outline configuration illustrated in FIG. 2. More particularly, in extending upwardly from the location 39 at which each of the edges 38 meets the upper horizontal surface 18 of base 17, the edge 38 may extend first approximately directly vertically upwardly at 40, and then curve progressively forwardly at 41 and then ultimately downwardly at 42 to a location 43 at which edge 38 may extend directly vertically downwardly at 44 and ultimately curve slightly forwardly to the upper edge of front wall 19. In extending from the location 45 to point 43, each edge 38 extends generally about axis 15, but at a progressively decreasing radial distance from that axis, with that radial distance being at a minimum at approximately the center of the vertical flat portion 44 of edge 38, directly forwardly of axis 15. The minimum radial distance of edge 38 with respect to axis 15 is designated by the letter r in FIG. 2.

Laterally between the two side walls 31 and 32, body 13 carries a central upwardly projecting structure 46, which may be molded integrally with the remainder of part 13 and is centered with respect to longitudinal axis 22 and received laterally between the two cords 11 and 12. As seen in FIG. 3, this portion 46 forms a loop 47 projecting upwardly through a slit 48 in locking member 14 in the locked position of the parts, so that the hasp 49 of a padlock, or another locking member, can extend through loop 47 in a manner retaining the locking member against upward swinging movement. Forwardly of loop 47, the upwardly projecting portion 46 of body 13 forms a vertical wall 50 extending parallel to axis 22 and parallel to and midway between walls 31 and 32, to define with walls 31 and 32 two compartments or passageways within which portions of cords 11 and 12 are received and located.

Figure 7:
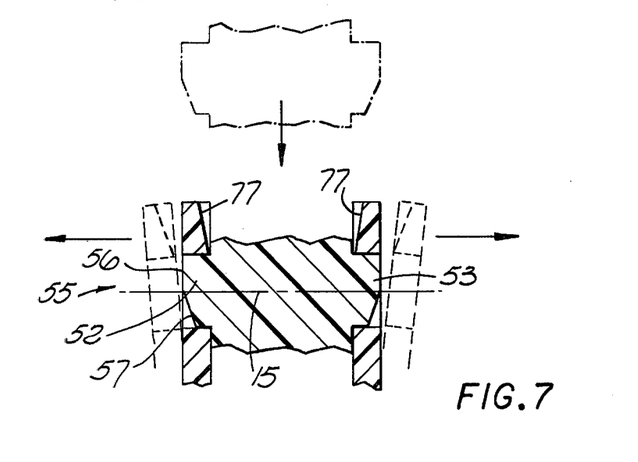
FIG. 7 is a fragmentary vertical section taken on line 7—7 of FIG. 6.

Body 13 and locking member 14 are both desirably molded of an appropriate resinous plastic material selected to be essentially rigid but to permit slight lateral deflection of walls 31 and 32 away from one another, as to the broken line positions represented in FIG. 7, during assembly of the parts, with the walls returning by their own resilience to the full line positions of FIG. 7 after such deflection. Materials typically usable for the purpose are polyethylene, polypropylene, or nylon.

Between the two spaced walls 31 and 32 of body 13, locking member 14 has a mounting and cord gripping portion including a wall 51 which in the FIGS. 2 to 4 full line locking position of member 14 may extend directly vertically perpendicular to upper surface 18 of base 17 of part 13. At its opposite sides, vertical wall 15 carries two aligned circular pivot lugs or stub shafts 52 and 53, having outer cylindrical surfaces 54 centered about axis 15 engageable with and closely fitting within inner cylindrical surfaces in openings 33 in walls 31 and 32, to effectively journal lugs 52 and 53 and member 14 for pivotal movement relative to body 13 about axis 15. At their outer sides, lugs 52 and 53 have faces 55 which for half of their circular extent are planar and disposed perpendicular to axis 15 (as seen at 56 in FIG. 7), and for the remainder of their circular extent form camming surfaces 57 disposed at an oblique camming angle with respect to axis 15. The dividing line between these two halves of end faces 55 is desirably a diameter extending through axis 15, as represented at 58 in FIG. 2.

Extending leftwardly from a lower portion of the vertical wall 51 of member 14, that member has a handle portion 59 which is generally horizontalin the FIG. 2 locked condition and is received above cords 11 and 12. Handle portion 59 contains the previously mentioned elongated slot 48 within which upwardly projecting portion 47 of part 13 is received. Handle 59 may have flanges 60 extending downwardly along opposite sides of the two cords 11 and 12 to assist in locating and confining them in the locked position of the parts, and may have laterally projecting lugs 61 at its extremity for facilitating manual actuation of the locking member. To strengthen member 14 near its right end, that member may have two spaced triangularly shaped portions 62 received adjacent walls 31 and 32.

For clamping the cords 11 and 12 downwardly against surface 18 and forwardly against surface 20 in the locked position of the parts, member 14 has two gripping portions 63 and 64 having the vertical sectional configuration illustrated in FIG. 4. Portion 63 projects downwardly within the compartment formed between central wall 50 of part 13 and side wall 32, while portion 64 similarly projects downwardly between central wall 50 and side wall 31, with the two portions 63 and 64 being separated by a groove 65 in the underside of part 14 into which wall 50 projects Each of the clamping portions 63 and 64 may be defined at its underside by a cylindrically curving surface 66 centered and curving about an axis 67 extending parallel to but spaced eccentrically forwardly from axis 15 (and in the same horizontal plane as axis 15). This cylindrical surface may extend between the locations 68 and 69 of FIG. 4, with each of the portions 63 and 64 having a surface 70 extending angularly forwardly and upwardly from location 69 to a tooth-like edge or peak 71. By virtue of the eccentricity of cylindrical surface 66 with respect to axis 15, the radial distance from axis 15 to the point 69 is greater than any other portion of surface 66 rearwardly of the location 69. Similarly, the surface 70 is disposed at an angle such that the radial distance between axis 15 and that surface, and between axis 15 and the point 71, is at all points less than the radial distance a between axis 15 and the point 69. Thus, in accordance with the teachings of my above mentioned copending application Ser. No. 106,714, the portions 63 and 64 move through a center position to an overcenter position when locking member 14 is swung from its broken line position of FIG. 4 to its full line locked position of that figure. During the final portion of that swinging movement, the portion 69 of member 14 reaches a point of closest proximity to surface 18 of part 13 when portion 69 is directly beneath and in vertical alignment with axis 15, and beyond that point portion 69 gradually moves upwardly in overcenter relation. In that overcenter condition, the cords 11 and 12 are still clamped tightly downwardly against surface 18, but exert an upward force against portions 63 and 64 resisting reverse swinging movement of member 14 through the center condition and to its released position. Also, in the FIG. 4 locked condition, the tooth-like projections or peaks 71 of portions 63 and 64 clamp the upwardly extending portions of the two cords tightly against vertical wall 19, to effectively grip the cords in a kinked condition positively locking them against longitudinal movement. It is contemplated that in lieu of the cylindrical surfaces 66 of portions 64 and 65, those portions may have a series of gripping teeth trailing portion 69 (leftwardly of that portion in FIG. 4), with the peaks of the teeth being centered about eccentric axis 67 in the manner described in my above mentioned application Serial No. to further enhance the gripping action.

In the locking position of member 14 (full line position of FIGS. 1 to 5), the vertical portion 51 of member 14 extends upwardly beyond the peripheral edges 38 of walls 31 and 32, and forms projections 72 and 73 extending laterally outwardly in opposite directions past edges 38 and carrying interlocking projections 74 and 75 extending radially inwardly with respect to axis 15 adjacent the outer surfaces 35 of walls 31 and 32. These surfaces 35 may be planar and parallel to one another and perpendicular to axis 15, and the inner surfaces 76 of projections 74 and 75 may similarly be planar and parallel to one another and disposed perpendicular to axis 15, and be received closely adjacent and essentially in contact with surfaces 35.

In the full line locking position of member 14 as viewed in FIGS. 1 through 5, interlocking projections 74 and 75 are received in overlapping relationship with peripheral edges 38 of walls 31 and 32 to effectively block laterally outward deflection of those walls away from one another. When the member 14 is swung to the broken line position of FIG. 4, however, the projections 74 and 75 are located farther from axis 15 than is the then adjacent portion 44 of peripheral edge 38 (see FIG. 6), so that projections 74 and 75 no longer block laterally outward deflection of walls 31 and 32 away from one another.

In order to deflect walls 31 and 32 apart during assembly, the two walls 31 and 32 have at their inner sides, above pivot openings 33, upwardly and outwardly inclined camming surfaces 77, disposed at an oblique angle with respect to axis 15 corresponding to the angularity of the previously mentioned semi-circular camming surfaces 57 on pivot lugs 52 and 53.

During assembly of the two parts 13 and 14, the part 14 is first moved to a position above the space between side walls 31 and 32 of part 13, and is so oriented at that location that the handle portion 59 of member 14 projects generally upwardly as represented in broken lines in FIG. 4. In that condition, the camming faces 57 of the pivot lugs 52 and 53 are at the lower halves of those lugs, and the portion of member 14 which carries interlocking projections 74 and 75 is pointed directly forwardly as illustrated in broken lines at 51' in FIG. 4. With the part 14 so oriented, it is moved downwardly relative to part 13, with camming faces 57 of pivot lugs 52 and 53 contacting camming faces 77 of walls 31 and 32, to gradually deflect walls 31 and 32 laterally away from one another as represented in broken lines in FIG. 7, until lugs 52 and 53 reach a point at which they can be received within circular openings 33, at which time walls 31 and 32 resiliently return back to their vertical and parallel positions of FIG. 5 to confine the pivot lugs within openings 33. During such lateral deflection of walls 31 and 32, projections 74 and 75 are located radially beyond the adjacent portions 44 of peripheral edges 38 of walls 31 and 32, so that projections 74 and 75 do not interfere with such lateral deflection of walls 31 and 32.

After the parts have been assembled in this manner, and cords 11 and 12 have been threaded through the device in the manner illustrated in FIGS. 1 to 4, member 14 may be swung downwardly to its full line locking position of FIGS. 1 to 4, to move clamping portions 64 and 65 through center positions of close proximity to surface 18, and to the slightly overcenter locked position of FIG. 4 as previously discussed, to clamp the kinked cords between parts 13 and 14 in a manner preventing rightward longitudinal movement of the cords. A padlock or other locking member may then be inserted through loop 47 as seen in FIG. 3, to lock member 14 against upward releasing movement, and thereby positively retain the device in its cord gripping condition. In that locked condition, the interlocking projections 74 and 75 on part 14 are received as illustrated in FIG. 5, and thus prevent a person from prying walls 31 and 32 away from part 14 to disassemble the parts. Surreptitious opening of the device is thus prevented. If a person pries walls 31 and 32 apart with a force great enough to overcome the interlocking effect of projections 74 and 75, the resultant damage to those projections will reveal the fact that there has been tampering.

Figure 8:
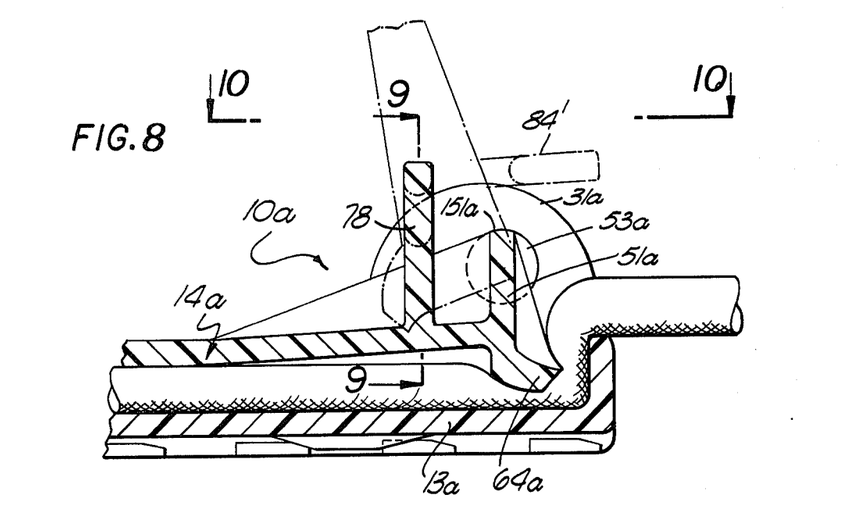
FIG. 8 is a fragmentary vertical longitudinal section similar to FIG. 4, but showing a variational form of the invention.
Figures 9, 10, 11:
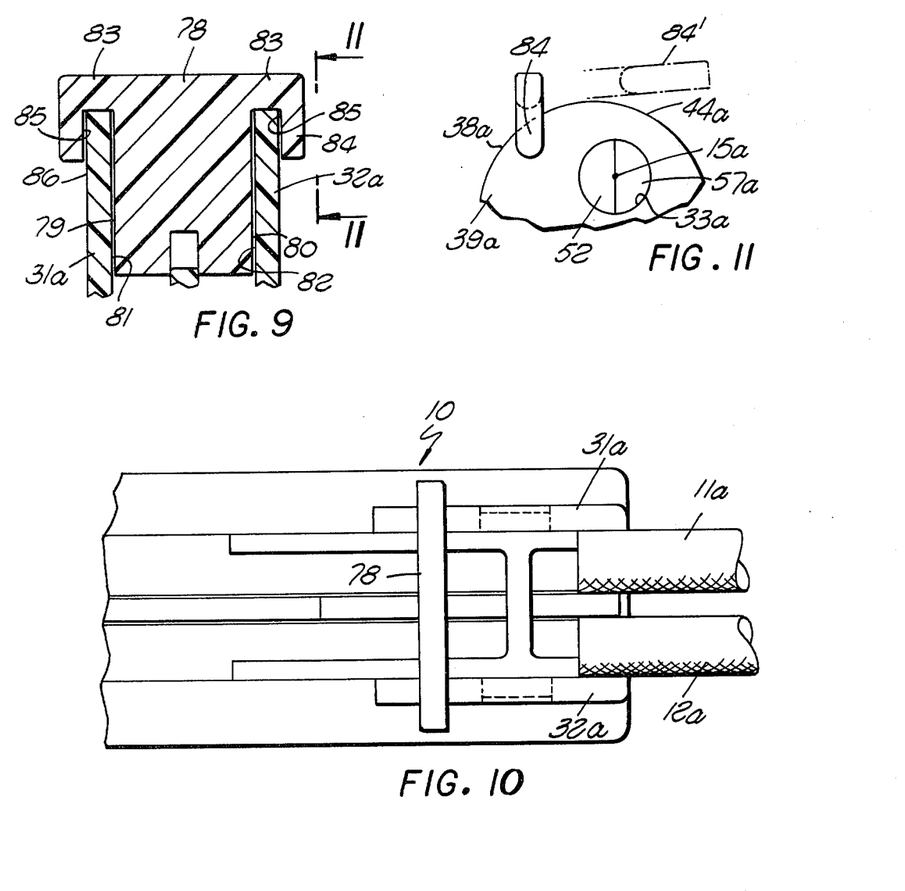
FIG. 9 is a fragmentary vertical section taken on line 9—9 of FIG. 8.
FIG. 10 is a fragmentary plan view taken on line 10—10 of FIG. 8.
FIG. 11 is a fragmentary side elevational view taken on line 11—11 of FIG. 9.

FIGS. 8 to 11 illustrate a variational form of the invention which may be essentially the same as that shown in FIGS. 1 to 7 except with regard to the differences specifically discussed below relating to the details of the interlocking relationship between the two parts of the device. As in the first form of the invention, the device 10a of FIGS. 8 to 11 includes a main body member 13a and a locking member 14a mounted for pivotal movement relative to member 13a between the full line locking position of FIG. 8 and the broken line released position. The two cords 11a and 12a extend between the parts in the same manner illustrated in FIGS. 1 to 7, and are locked against longitudinal movement when member 14a is in its FIG. 8 full line position. The two gripping portions 63a and 64a of part 14a function in the same manner discussed in connection with the first form of the invention, and are located between two spaced parallel side walls 31a and 32a whose peripheral edges 38a curve generally about the pivotal axis 15a as seen in FIGS. 8 and 11, and advance progressively toward that axis as they advance from the location 39a to the location 44a. The configuration of these peripheral edges 38a is generally the same as that of edges 38 of FIGS. 1 to 7, except that the forward directly vertical or flat portion of these edges which appears in FIGS. 1 to 7 is not necessary in FIGS. 8 to 11.

The locking member 14a includes a vertical wall 51a similar to the wall 51 of FIGS. 1 to 7, but terminating upwardly at an upper edge 151a aligned with the upper extremities of the two laterally projecting pivot lugs 52a and 53a received within pivot openings or recesses 33a in walls 31a and 32a.

Instead of forming the interlocking projections at the upper edge of vertical wall 51a, the locking member 14a is provided with a second wall 78, which extends parallel to wall 51a and is vertical in the FIG. 8 full line locking position of part 14a. This wall 78 is defined at its opposite sides by two parallel vertical side edges 79 and 80, which are received between and may laterally engage the inner vertical surfaces 81 and 82 of walls 31a and 32a. At its upper extremity, vertical wall 78 has portions 83 which project laterally past the peripheral edges 38a of walls 31a and 32a, and which then carry downwardly extending interlocking lugs or projections 84 having inner vertical surfaces 85 received closely adjacent and engaging the outer vertical surfaces 86 of walls 31a and 32a. In the FIG. 8 locking position of member 14a, interlocking projections 84 have portions which are received closer to pivotal axis 15a than are the corresponding portions of peripheral edges 38a, to thus overlap the peripheral edges and prevent lateral separating movement of walls 31a and 32a. When part 14a is pivoted to the broken line released or unlocked position of FIG. 8, the interlocking projections 84 move to the positions represented in broken lines at 84' in FIGS. 8 and 11, in which positions projections 84 are beyond peripheral edges 38a and no longer prevent lateral separating movement of walls 31a and 32a. Consequently, in that broken line orientation of FIGS. 8 and 11, the part 15a can be forced downwardly between walls 31a and 32a, with those walls being deflected apart by the camming surfaces 57a on pivot lugs 52a and 53a as in the first form of the invention. The lateral deflection of the opposite side walls 31a and 32a upon assembly of the parts is the same in FIGS. 8 to 11 as has been represented and discussed in connection with FIGS. 1 to 7.

FIGS. 12 to 15 show a third form of the invention, which is essentially the same as the first two forms except for the manner in which the parts are interlocked to prevent separation of the parts in their locked condition. As in the other forms of the invention, the cord lock 10b of FIGS. 12 to 15 includes a main body part 13b and a locking member 14b mounted for swinging movement relative to part 13b about a horizontal axis 15b between the full line position of FIG. 12 in which two cords 11b and 12b are retained against longitudinal movement, and the broken line released position of FIG. 12 in which the cords can be moved longitudinally. Member 14b and the cords are received between two spaced parallel vertical opposite side walls 31b and 32b projecting upwardly from the base 17b of member 13b and having the outline configuration illustrated in FIG. 12. The cord gripping portions 64b of member 14b may be the same as described in connection with the first form of the invention, and may act to clamp the cords against the base member 13b in the full line position of FIG. 12 as illustrated.

As in the first form of the invention, the member 14b has a vertical portion or wall 51b projecting upwardly from the gripping portion 64b and carrying two aligned externally cylindrical pivot lugs 52b and 53b at opposite sides of member 14b, with these lugs being centered about the previously mentioned horizontal axis 15b. Lugs 52b and 53b are closely received and rotatably journaled within two cylindrical openings 33b formed in the two side walls 31b and 32b to mount member 14b for its pivotal movement. The axially outer faces of the pivot lugs from semi-circular planar surfaces 56b corresponding to surfaces 56 of the first form of the invention and disposed directly transversely of axis 15b, and also form inclined approximately semi-circular camming faces 57b corresponding to surfaces 57 of the first form except for provision at the center of surfaces 57b of projections 74b and 75b serving the function of the interlocking projections 74 and 75 of FIG. 5. As seen in FIG. 13, the projections 74b and 75b project generally radially of axis 15b from the outer end portions of pivot lugs 52b and 53b, and more particularly project in a rightward direction as viewed in FIG. 12 when member 14 is in its horizontal locking position. The axially outer surfaces 157b of projections 74b and 75b are camming faces which may be planar and converge progressively toward one another and toward the central longitudinal axis 22b of the device when the locking member is in its locked position. Projections 74b and 75b project radially beyond the outer cylindrical surfaces 54b of the pivot lugs 52b and 53b. Above the locations of the two pivot openings 33b in walls 31b and 32b, those walls have inner camming faces 77b which converge as they advance downwardly and which correspond to surfaces 77 of FIG. 7 except that in the FIGS. 12 to 16 device each of the faces 77b is interrupted at its center by a vertically extending groove 177b, which extends outwardly into the material of the corresponding side wall 31b or 32b and may have the rectangular horizontal sectional configuration illustrated in FIG. 13. The radial depth of each groove 177b is such as to receive the corresponding projection 74b or 75b without contacting that projection when the camming surfaces 57b and 77b are in engagement during assembly of the parts.

In the assembled condition of the parts, projections 74b and 75b are received within two arcuate grooves 87 formed in the outer sides of walls 31b and 32b adjacent openings 33b. Each of these grooves 87 may extend from a first end wall 188 of the groove, behind the corresponding opening 33b and above the level of its center, downwardly to the underside of the opening and then upwardly at the front of the opening to a forward end wall 88 of the groove forwardly of the opening and higher than its center. The cross-section of each such groove may be generally rectangular, as seen in FIG. 13, and its axial depth may be at least as great as or preferably slightly greater than the axial thickness of the projections 74b and 75b, so that each of the projections may be received entirely within the corresponding groove 87 in the assembled position of the parts. In the full line locking position of FIG. 12, projections 74b and 75b are received near but preferably not in contact with the end walls 88 of the grooves, while in the broken line released position of the locking member the projections 74b and 75b project directly downwardly with respect to and beneath axis 15b. At the location of the projections in this downwardly extending condition, walls 31b and 32b contain typically essentially rectangular openings 89 which extend through the entire thickness of the walls 31b and 32b, and which have a size and configuration in a plane transversely of axis 15b (as viewed in FIG. 12) corresponding to and slightly greater than the size and configuration of projections 74b and 75b as viewed in the same transverse plane, so that the projections in that position do not interfere with relative separating movement of the two walls 31b and 32b. The axially inner surfaces 90 of projections 74b and 75b extend approximately parallel to one another and approximately perpendicular to axis 15b, and in the FIG. 13 position of the parts are received closely adjacent and slidably engage the inner walls or surfaces 91 of grooves 87 which are also disposed parallel to one another and perpendicular to pivotal axis 15b.

In assembling the two parts of the FIGS. 12 to 15 device, locking member 14b is first held above the space between walls 31b and 32b, with the handle of member 14b projecting upwardly and with projections 74b and 75b projecting directly downwardly. The locking member in this condition is moved downwardly relative to walls 31b and 32b, with camming surfaces 157b and 57b engaging camming surfaces 77b (FIG. 14) to deflect the walls 31b and 32b apart as to the broken line positions of FIG. 14 as a result of the downward movement of part 14b. During the initial portion of such downward movement of part 14b, surfaces 157b of projections 74b and 75b engage the upper portions of surfaces 77b, to initiate the lateral deflection of walls 31b and 32b. When the camming surfaces 57b reach a point at which their lower extremities are horizontally opposite the upper ends of surfaces 77b, surfaces 57b engage surfaces 77b and continue the lateral deflection of walls 31b and 32b, with projections 74b and 75b at that point moving into grooves 177b and then moving downwardly through those grooves during the final portion of the downward movement. The grooves 177b are of a radial depth great enough to permit such reception of projections 74b and 75b therein while surfaces 57b engage and deflect surfaces 77b, so that surfaces 57b can take over the camming action from surfaces 157b as soon as they reach a point low enough to contact surfaces 77b.

Figure 14:
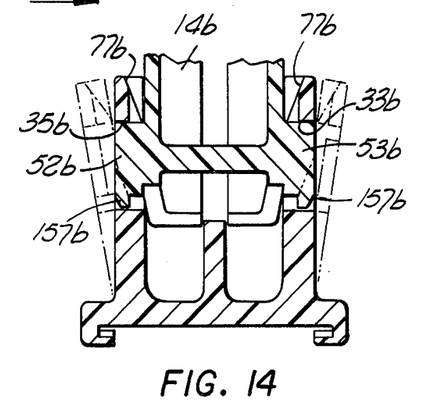
FIG. 14 is a fragmentary vertical section taken on line 14—14 of FIG. 12, but showing the locking member in its vertical released position.
Figure 15:
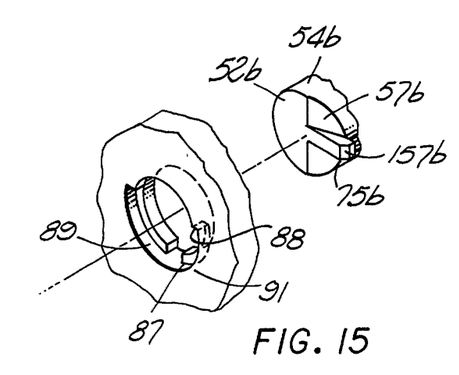
FIG. 15 is a fragmentary exploded perspective view of the pivotal connector elements of the FIG. 13 device.
Figure 16:
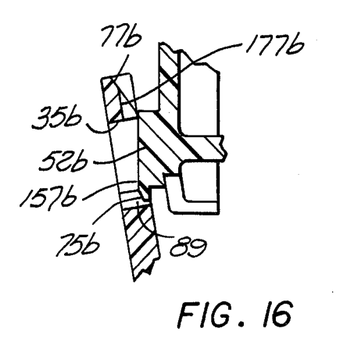
FIG. 16 is an enlarged fragmentary view corresponding to a portion of FIG. 14, and showing the parts during assembly but just before the locking member has reached its fully assembled position.

When part 14b reaches a position in which the pivot lugs 52b and 53b are directly axially opposite circular openings 33b, the pivot lugs snap into those openings and walls 31b and 32b return to their full line position of FIG. 14 by the resilience of the material of which those walls are formed. Just before the walls snap back to their full line positions, the parts are in the positions illustrated in FIG. 16, in which the axially outer surfaces of the pivot lugs are still in engagement with the inner surfaces of walls 31b and 32b to hold them against inward return toward one another. The reception of projections 74b and 75b within openings 89 in this FIG. 16 condition of the parts prevents the projections 74b and 75b from interfering with maintenance of the walls in their spread condition, or interfering with inward return of the walls toward one another when the lugs are received within their pivot openings. After the parts are assembled to the FIG. 14 condition, swinging movement of member 14b from its broken line position of FIG. 12 toward its full line position moves the projections 74b and 75b into the grooves 87, and to positions axially outwardly of the walls 91 of those grooves to effectively interlock the parts in a manner blocking separating movement of walls 31b and 32b when member 14b is in its full line locking position of FIG. 12.

Figure 12:
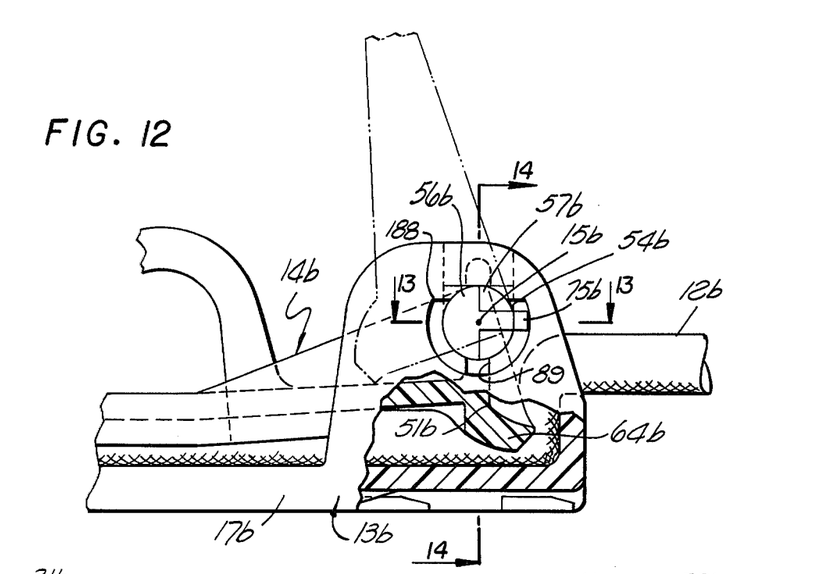
FIG. 12 is a fragmentary side view similar to FIG. 2 but showing another variational form of the invention, with FIG. 12 being partially broken away to show the cord gripping portion of the locking member in a plane corresponding to that of FIG. 4.
Figure 13:
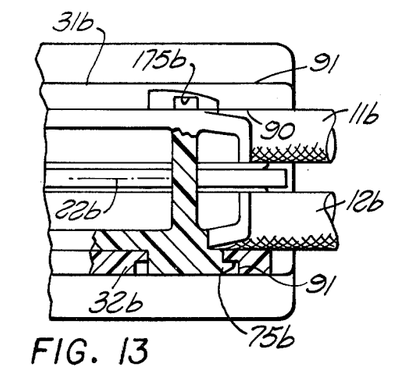
FIG. 13 is a fragmentary horizontal section taken on line 13—13 of FIG. 12.

During the swinging movement of member 14b between its full line and broken line positions of FIG. 12, the interlocking projections 74b and 75b are received within the forward halves of arcuate groove 87, between openings 89 and the forward extremities 88 of the grooves. The rear half of each groove, between openings 89 and the rear extremity 188 of the groove, is provided to enable part 14b to be swung in a clockwise direction beyond the broken line position of FIG. 12 without damaging the projections 74b and 75b. Grooves 87 are of a great enough length circularly to avoid contacting of projections 74b and 75b with the ends of the grooves in any position to which member 14b is able to swing as determined by the remainder of the structure of the parts. There is thus no danger of accidental breaking of the projections by virtue of such contact.

While certain specific embodiments of the present invention have been disclosed as typical, the invention is of course not limited to these particular forms, but rather is applicable broadly to all such variations as fall within the scope of the appended claims.

I claim:

1. A device for gripping an elongated flexible element comprising:
   a first member; and
   a second member pivotally movable relative to the first member between locking and released positions and acting in said locking position to prevent relative longitudinal movement of said element and in said released position to permit such relative longitudinal movement;
   said first and second members having interfitting pivotal connector portions one forming a pivot lug and the other forming a recess pivotally receiving said lug to interconnect the members for said relative pivotal movement;
   one of said connector portions being deflectible laterally in a direction away from the other during assembly of the device to pass said lug into said recess;
   one of said members having an interlocking projection which in said locking relative position of the members prevents said lateral deflection of said one connector portion in said direction to prevent disassembly of the members in said locking position.

2. A device as recited in claim 1, in which said interlocking projection in said released relative position of said members is so located that it does not prevent lateral deflection of said one connector portion in said direction to thereby permit deflection of said one connector portion during assembly of the device.

3. A device as recited in claim 1, in which the one of said members which has said one connector portion is formed of resiliently distortable material tending by its resilience to resist lateral deflection of said one connector portion in said direction away from the other connector portion, and to return said one connector portion toward the other.

4. A device as recited in claim 1, in which said interlocking projection is carried by said pivot lug.

5. A device as recited in claim 1, in which said one connector portion is said recess and is formed in a wall of one of said members which is deflectible laterally during assembly of the device to pass said lug into said recess.

6. A device as recited in claim 1, in which said one connector portion is said recess and is formed in a wall of one of said members which is deflectible laterally during assembly of the device to pass said lug into said recess, said interlocking projection being carried by said pivot lug at an outer end thereof beyond said wall to block said deflection of the wall.

7. A device as recited in claim 6, in which said wall is recessed axially opposite said projection in said released position of said projection in a relation avoiding interference by the projection with said lateral deflection of said wall during assembly of the device.

8. A device as recited in claim 1, in which one of said members includes a wall carrying said one connector portion and deflectible laterally therewith away from the other member to pass said lug into said recess, the other of said members carrying the other connector portion at a first side of said wall and having a portion projecting past a peripheral edge of said wall and extending inwardly generally toward the pivotal axis of the members at a second side of said wall to form said interlocking projection blocking lateral deflection of the wall.

9. A device as recited in claim 8, in which said peripheral edge of said wall has a portion which is axially opposite said interlocking projection in the locking position of the members to block said lateral deflection of the wall, said interlocking projection being beyond the peripheral edge of the wall in said released position of the members in a relation avoiding interference with lateral deflection of the wall.

10. A device as recited in claim 1, in which said members have camming surfaces interengageable to deflect said one connector portion laterally away from the other and thereby pass said lug into said recess during assembly of the members when in said released position.

11. A device as recited in claim 1, in which one of said members has a loop portion positioned for projection though an opening in the other member in said locking position of the members and adapted to receive a locking part in a relation retaining said second member against swinging movement from said locking position to said released position.

12. A device for gripping an elongated flexible element comprising:
a first member; and
a second member pivotally movable relative to the first member between locking and released positions and acting in said locking position to prevent relative longitudinal movement of said element and in said released position to permit such relative longitudinal movement;
said first member having a pair of spaced walls between which said second member is received;
there being two axially aligned pivotal connections between said second member and said two spaced walls respectively with each of said connections including a pivot lug and a journaling recess one carried by one of said walls and the other carried by said second member;
said walls in said released position of the second member being deflectible laterally away from one another during assembly of the device to pass said lugs into said recesses;
said second member having interlocking projections which in said locking position of the second member are received at outer sides of said walls respectively at locations blocking lateral movement of the walls away from one another to prevent disassembly of the members in said locking position.

13. A device as recited in claim 12, in which said journaling recesses are formed in said walls, and said pivot lugs are carried by said second member and project in opposite directions therefrom.

14. A device as recited in claim 12, in which said members have camming surfaces engageable to deflect said walls laterally apart during assembly of the members when said second member is in said released position to pass said lugs into said journaling recesses.

15. A device as recited in claim 12, in which said journaling recesses are formed in said walls, and said pivot lugs are carried by said second member and project in opposite directions therefrom, said interlocking projections being carried by outer ends of said pivot lugs.

16. A device as recited in claim 15, in which said walls are recessed at locations axially opposite said interlocking projections in said released relative position of the members in a relation avoiding interference by said projections with said lateral deflection of the walls away from one another in said released position of the members and thereby permitting assembly of the device.

17. A device as recited in claim 15, in which said projections and said lugs have camming surfaces engageable with said walls to deflect them apart as the device is assembled with said members in said released relative positions, said walls containing arcuate recesses at their outer sides within which said projections swing during relative pivotal movement of the members, said walls having openings which are axially opposite said interlocking projection in said released relative position of the members and which extend entirely through the thickness of said walls to avoid interference with lateral deflection of the walls during assembly of the device.

18. A device as recited in claim 12, in which said second member has portions projecting in opposite directions laterally past peripheral edges of said walls and extending inwardly generally toward the pivotal axis of said members at outer sides of the walls to form said interlocking projections.

19. A device as recited in claim 18, in which said peripheral edges of said walls have first portions received axially inwardly opposite said interlocking projections in said locking position of the second member and have second circularly offset portions of reduced radius with respect to the pivotal axis of said members and which are received adjacent the interlocking projections in said released position of the second member but are of small enough radius to be deflectible laterally otwardly without interference by said projections.

20. A device as recited in claim 12, in which said first member has a loop projecting through a slit in said second member in the locking position thereof and adapted to receive a padlock or other locking part to retain the second member in locking position.

21. A device as recited in claim 12, in which said members are constructed to pass therebetween two of said elongated flexible elements extending essentially parallel to one another, said second member having portions engageable with both of said elongated flexible elements in said locking position of the second member and acting to clamp said elements against said first member to prevent longitudinal movement thereof, said first member having a portion received between said two elements and forming a loop projecting through a slit in said second member when it is in said locking position and adapted to receive a padlock or other locking part retaining the second member in locking position.

22. A device as recited in claim 12, in which said journaling recesses are formed in said walls, and said pivot lugs are carried by said second member and project in opposite directions therefrom, said interlocking projections being carried by and projecting radially from outer ends of said pivot lugs, said walls having first camming surfaces, said projections having second camming surfaces engageable with said first camming surfaces to deflect said walls apart as said second member is moved relative to said first member during an initial portion of an assembling movement, said pivot lugs having third camming surfaces engageable with said first camming surfaces to deflect said walls farther apart during a later portion of said assembling movement.

23. A device as recited in claim 22, in which said first camming surfaces contain recesses dimensioned and located to receive said projections during said later portion of said assembling movement in a relation enabling said third camming surfaces to contact said first camming surfaces and take over the camming action from said second camming surfaces.

* * * * *